F. C. AVERY AND R. E. THOMPSON.
BOTTOM FOR LIQUID HEATING VESSELS.
APPLICATION FILED SEPT. 30, 1919.

1,342,888.

Patented June 8, 1920.

Inventors
Frank C. Avery and
Roy E. Thompson.
by E. E. Rodabaugh
Attorney.

UNITED STATES PATENT OFFICE.

FRANK C. AVERY AND ROY E. THOMPSON, OF SAN DIEGO, CALIFORNIA.

BOTTOM FOR LIQUID-HEATING VESSELS.

1,342,888.     Specification of Letters Patent.     Patented June 8, 1920.

Application filed September 30, 1919. Serial No. 327,493.

*To all whom it may concern:*

Be it known that we, FRANK C. AVERY and ROY E. THOMPSON, citizens of the United States, residing at San Diego, in the county of San Diego, State of California, have invented a new and useful Improvement in Bottoms for Liquid-Heating Vessels, of which the following is a specification.

Our invention relates to improvements in bottoms for vessels for heating liquids, in which a plurality of pipes is used in conjunction with the bottom of the vessel for increasing the area of the heating surface that may be acted upon by the flame or other heating medium, and the objects of our invention are to provide, first, a vessel bottom which has an enlarged heating surface; second, that will economize in the amount of fuel used in heating liquids; third, that is simple of construction, and fourth, that may be mounted readily on any liquid heating vessel.

Figure 1:
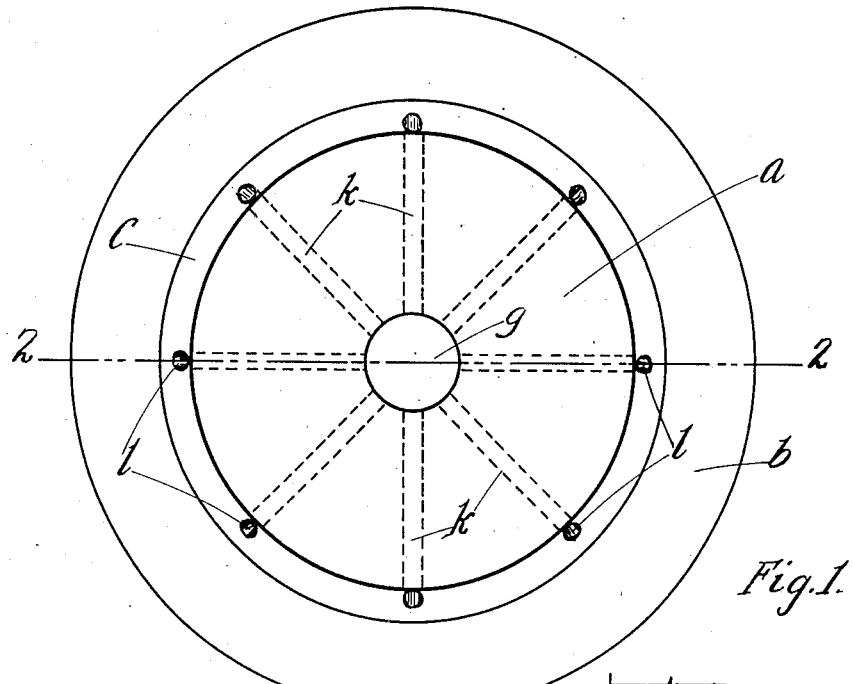
Figure 2:
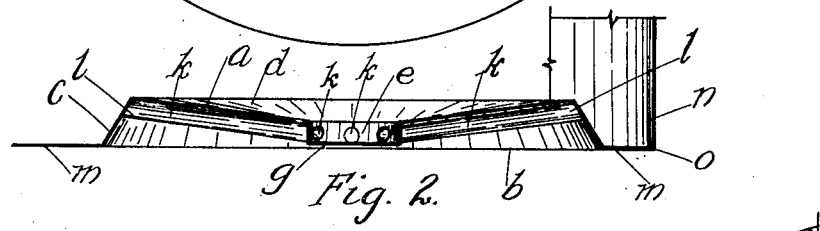
Figure 3:
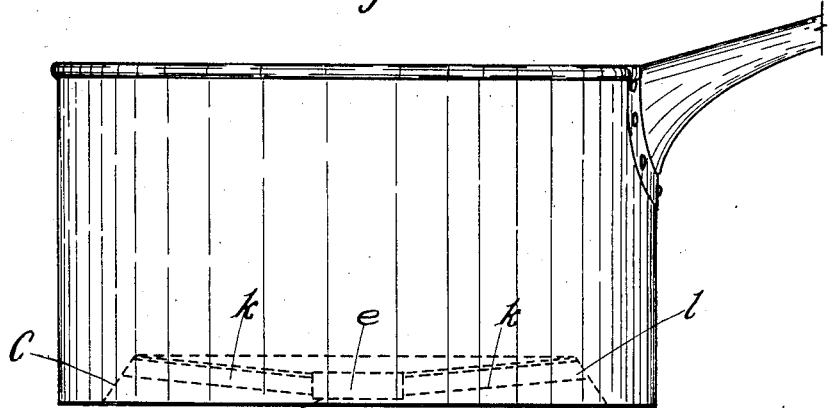

We attain these objects by the construction illustrated in the accompanying drawings, in which, Figure 1 is a top view of our invention showing in dotted lines the liquid carrying tubes; Fig. 2 is a cross section through line 2—2 of Fig. 1, showing a part of a vessel in broken section to which our device is attached, and Fig. 3 is a front elevational view of a liquid heating vessel provided with our device and showing in dotted lines a portion of our improved bottom.

Similar characters refer to similar parts throughout the several views.

In the drawings, $a$ represents the bottom of a vessel adapted for heating liquid. The bottom $a$ is provided with a flat outer portion $b$, a converging portion $c$, a concave portion $d$, a chamber $e$ and a bottom portion $g$. A plurality of pipes $k$ open at their one ends into the chamber $e$ and the other ends of said pipes $k$ open at $l$ through the converging portion $c$. These pipes $k$ diverge from the chamber $e$ and run parallel to and below the concave portion $d$ at a sufficient distance below said concave portion $d$ to permit the heat from the heating source (not shown) to pass between said pipes $k$ and said concave member $d$. An extended portion $m$ is provided which adapts the bottom $a$ to be brazed or otherwise attached to vessels of various diameters.

It is obvious that with the structure shown and described we have provided a bottom for liquid heating vessels that can be readily attached to any vessel requiring a bottom, by brazing or otherwise attaching the portion $m$ to the vessel $n$ at $o$; that by reason of the pipes $k$ and their locations relative to the concave member $d$ a very large heating surface is provided that will come in contact with a flame or other heating medium.

What we claim, and desire to secure by Letters Patent, is:

1. A device of the kind described having a flat outer portion, a converging portion, a concave portion, a chamber, a bottom portion, a plurality of converging pipes each opening at one end into said chamber and at the other end passing through said converging portion into said vessel, and a means adapting said device to be mounted on a liquid heating vessel.

2. A bottom for liquid heating vessels, comprising a flat outer portion, a converging portion arising from said flat portion, a concave portion having a centrally located chamber, continuing from said converging portion, a bottom portion below said chamber, a plurality of pipes radiating from said chamber through said converging portion adapted to conduct a liquid from said chamber through said converging member into said vessel, and means adapted for attaching said bottom to a vessel for heating liquids.

In testimony whereof we have hereunto subscribed our names.

FRANK C. AVERY.
ROY E. THOMPSON.